United States Patent
Abusleme et al.

(10) Patent No.: US 7,033,671 B2
(45) Date of Patent: Apr. 25, 2006

(54) MULTILAYERS OF FLUOROPOLYMERS WITH CHLORINATED POLYVINYLCHLORIDE

(75) Inventors: Julio Abusleme, Varese (IT); Claudia Manzoni, Bologna (IT); Giambattista Besana, Como (IT)

(73) Assignee: Solvay Solexis, S.p.A., Milan (IT)

( * ) Notice: Subject to any disclaimer, the term of this patent is extended or adjusted under 35 U.S.C. 154(b) by 0 days.

(21) Appl. No.: 10/347,353

(22) Filed: Jan. 21, 2003

(65) Prior Publication Data

US 2003/0138636 A1    Jul. 24, 2003

(30) Foreign Application Priority Data

Jan. 22, 2002   (IT) ................ MI2002A0101

(51) Int. Cl.
*B32B 27/30*    (2006.01)
*B32B 27/34*    (2006.01)

(52) U.S. Cl. ............... 428/421; 428/474.4; 428/475.5; 428/476.3; 428/522

(58) Field of Classification Search ........... 428/421, 428/474.4, 475.5, 476.3, 480, 520, 522
See application file for complete search history.

(56) References Cited

U.S. PATENT DOCUMENTS

| | | | |
|---|---|---|---|
| 3,935,159 A | * | 1/1976 | Demillecamps et al. .... 324/431 |
| 4,317,860 A | * | 3/1982 | Strassel ................ 428/421 |
| 4,543,378 A | | 9/1985 | Suhara et al. |
| 5,658,670 A | * | 8/1997 | Fukushi et al. ............. 428/421 |
| 5,700,578 A | | 12/1997 | Korney, Jr. et al. ......... 428/421 |
| 6,201,084 B1 | | 3/2001 | Abusleme et al. |

FOREIGN PATENT DOCUMENTS

| | | |
|---|---|---|
| CA | 2177412 | 12/1996 |
| EP | 1101994 | 5/2001 |
| EP | 1101994 | 5/2002 |

OTHER PUBLICATIONS

Encyclopedia of Polymer Science and Engineering, Supplemental Volume, Vinyl CHLoride Polymers: Chemical and Solution Properties, pp. 848-849, Jun. 1992.*
Alger, Polymer Science Dictionary, 2nd Edition, pp. 6-7, Apr. 1999.*

* cited by examiner

*Primary Examiner*—Ramsey Zacharia
(74) *Attorney, Agent, or Firm*—Arent Fox PLLC

(57) ABSTRACT

Multilayers comprising at least one laminate formed in sequence by the following layers:
A) one thermoprocessable fluoropolymer layer comprising units deriving from vinylidenfluoride (VDF);
B) one polyamide layer blended with 0.01%–5% by weight of a diamine or one polyamide layer having at least 20 μeq/g of —NH$_2$ groups, or one thermoprocessable polymer layer containing (—COO—) units and/or —CN groups; and
C) one layer based on chlorinated polyvinylchloride (CPVC) containing from 58% to 75% by weight of chlorine.

19 Claims, No Drawings

MULTILAYERS OF FLUOROPOLYMERS WITH CHLORINATED POLYVINYLCHLORIDE

The present invention relates to multilayers (laminates) comprising at least one layer A) of fluoropolymer, one intermediate layer B) and one layer C) of chlorinated polyvinyl chloride (CPVC), characterized in having a complete adhesion among the layers, so that at the delamination tests the specimen breaks without the layer separation. Said multilayers show, besides a high adhesion among the layers, good mechanical properties, good flame resistance and, from the fluoropolymer layer A) side, good resistance to chemical agents.

The sheets of thermoprocessable fluoropolymers, in particular of fluoropolymers comprising units deriving from vinylidenfluoride (VDF) show good mechanical properties, very good resistance to flame and to chemical agents. However, they are expensive and those sheets of high thickness.

One way for producing less expensive sheets is to use the concept of laminates in which the fluoropolymer layer thickness is substantially reduced. Therefore, the non-fluoro polymer layer must be of lower cost and flame resistance for preserving the performance of the all-fluoropolymer sheet. A good candidate is the CPVC which is not a very expensive thermoprocessable polymer and shows a good flame-resistance. It contains from 58% to 75% by weight of chlorine and is obtained by polyvinylchloride (PVC) chlorination.

The Applicant has found that a bilayer of the aforesaid fluoropolymers with CPVC, obtained for example by applying a pressure on the overlapped layers maintained at their softening temperature, the adhesion is not obtained.

It has been surprisingly and unexpectedly found that it is possible to obtain an excellent adhesion between the fluoropolymers of layer A) and the CPVC of layer C) if a thin polymer layer as defined below is interposed between them.

An object of the present invention is therefore a multilayer comprising at least one laminate formed in sequence by the following layers:

A) one thermoprocessable fluoropolymer layer comprising units deriving from vinylidenfluoride (VDF);
B) one polyamide layer blended with 0.01%–5% by weight of a diamine or one polyamide layer having at least 20 µeq/g of —$NH_2$ groups, or one thermoprocessable polymer layer containing (—COO—) units and/or —CN groups; and
C) one layer based on chlorinated polyvinylchloride (CPVC) containing from 58% to 75% by weight, preferably from 60% to 70% by weight of chlorine.

The sheet formed by A/B/C layers shows good mechanical and flame-resistance and has excellent resistance to chemical agents on the fluoropolymer side.

To obtain a sheet wherein both the external surfaces are resistant to chemical agents it is possible to prepare a multi layer with the following sequence of layers A/B/C/B/A.

It is therefore a further object of the present invention a multi layer formed by five layers A/B/C/B/A wherein A, B and C have the above meaning.

The layer A) fluoropolymers of the present invention preferably contain at least 10% by moles of units derived from VDF. Said fluoropolymers can be VDF homopolymers or VDF copolymers with other ethylenically unsaturated monomers, preferably selected from the group formed by hexafluoropropene (HFP), chlorotrifluoroethylene (CTFE), tetrafluoroethylene (TFE), perfluoroalkylvinylethers such for example perfluoropropylvinylether, trifluoroethylene, fluorodioxoles described in U.S. Pat. No. 6,201,084, ethylene, propylene.

The comonomers copolymerized with VDF are in amounts such to obtain a thermoprocessable polymer.

Said polymers are partially crystalline.

Preferably as layer A), polyvinylidenfluoride (PVDF) is used.

In layer B) any polyamide can be used provided that it is blended with 0.01%–5% by weight of a diamine.

The layer B) polyamides having an amount of —$NH_2$ end groups higher than 20 µeq/g, can be prepared according to known methods, for example according to U.S. Pat. No. 4,543,378, wherein a chain transfer agent such, for example, m- or p-xylylendiamine, hexamethylendiamine or dodecamethylendiamine is used in the polymerization phase.

The layer B) polyamide having an amount of —$NH_2$ end groups higher than 20 µeq/g can also be obtained by mixing polyamides having a different —$NH_2$ end group content so that the final mixture contains an amount of —$NH_2$ end groups higher than 20 µeq/g.

The layer B) polyamides can be of the (co) polyamide type such, for example, polyamide 6 (PA 6), polyamide 66 (PA 66), polyamide 11 (PA 11), polyamide 12 (PA 12).

When layer B) polyamides are added with diamines, these can be for example: protected amines, as hexamethylendiaminecarbamate and N,N'-dicinnamyilidene-1,6 hexandiamine; $C_4$–$C_{20}$ aliphatic diamines such, for example, dodecyldiamine and decyldiamine; aromatic diamines such, for example, para-xylylendiamine. Protected diamines, both aliphatic and aromatic, are preferred.

The layer B) polymers preferably contain at least 10% by moles of monomers containing (—COO—) units and/or —CN groups. Said polymers can be poly(alkyl(meth)acrylates), for example poly(methylmethacrylate) (PMMA), or copolymers of alkyl (meth)acrylates with acrylic acid, for example, poly(ethyl acrylate/acrylic acid), poly(ethylhexylacrylate/acrylic acid), poly(vinylesters), for example poly (vinylacetates), poly(acrylonitrile). Among the layer B) polymers containing (—COO—) units, polyalkyl(meth) acrylates, in particular PMMA, are preferred.

Preferably as layer B) polyamides having at least 20 µeq/g of $NH_2$ end groups or a polyamide blended with 0.01–5% by weight of a diamine, are used.

The layer B) polyamides, having —$NH_2$ end groups higher than 20 µeq/g can optionally contain diamines. Layer B) can have a thickness much lower than that of layer C). Layer B) can also be formed by a blend of the polymer of layer A), or of layer C), optionally in admixture among each other, with at least 10% by weight, preferably at least 50% by weight of the layer B) polymer as above.

The (co)polymers of the single layers of the invention can optionally contain additives such as fillers for example polytetrafluoroethylene (PTFE), silicates, graphite, titanium dioxide, lubricants, pigments, fire retardants, plasticizers, thermal and UV stabilizers.

The multilayer structures of the present invention can be obtained by co-extrusion. Alternatively, the single layers are laminated by compression at the polymer softening temperature.

The multilayers according to the present invention can be used as structural elements for working plans, coating panels, in the building of moulded articles, for example "wet-benches", used in the semicon industry.

Some illustrative Examples follow which are not limitative of the present invention.

EXAMPLES

The following characterizations carried out on the used polymers are indicated hereinafter:

Melt Flow Index (M.I.)
  The M.I. of the fluorinated polymers is measured according to the ASTM D 1238 method, at 232° C. and with a load of 5 kg.

Second melting temperature ($T_{mII}$)
  The $T_{mII}$ of the fluorinated polymers is determined by differential scanning calorimetry (DSC).

Glass transition temperature (Tg)
  The Tg of the CPVC polymers is determined by differential scanning calorimetry (DSC).

Clorine content in CPVC
  It has been determined by elemental analysis.

—$NH_2$ end groups
  The number of the —$NH_2$ end groups of polyamides is determined by preparing a solution at 2% of polyamide in m-cresol and subsequent titration with perchloric acid.

Example 1

Layer A)

PVDF

From a PVDF polymer having a $T_{mII}$ equal to 167° C., and MI equal to 2 g/10', plaques having a thickness of 1.5 mm have been obtained by compression moulding.

Layer B)

Polyamide 12 (PA 12) Having —$NH_2$ End Groups Equal to 110 μeq/g

Some films of the polyamide having a thickness of 0.3 mm have been obtained by compression moulding.

Layer C)

CPVC

Plaques having a thickness of 6 mm have been obtained by compression moulding from a CPVC polymer having Tg equal to 112° C. and chlorine content equal to 64.24% by weight.

Preparation of the A)/B)/C) Laminate

The single layers A), B) and C), previously obtained, have been overlapped and kept under pressure (about 2–3 bar) at a temperature of 200° C. for 10 minutes.

By applying a mechanical force one tries to separate layer A) from layer C).

One cannot measure the adhesion force between layer A) and layer C). By increasing the force to separate the layers, one breaks the manufactured article without obtaining the delamination. This shows that the laminate according to the invention shows a high adhesion.

Example 2 (Comparative)

Layer A)
  The same polymer of Example 1 is used.

Layer C)
  The same polymer of Example 1 is used.

Preparation of the A)/C) Laminate

The plaques of the single layers A) and C), previously obtained, have been overlapped and kept under pressure (about 2–3 bar) at a temperature of 200° C. for 10 minutes.

The A)/C) laminate does not show any adhesion between the layers.

Example 3 (Comparative)

Layer A)
  The same polymer of Example 1 is used.

Layer B)

PA 12 Having —$NH_2$ End Groups Equal to 13 μeq/g

Some films of the polyamide having a thickness of 0.3 mm has been obtained by compression moulding.

Layer C)
  The same polymer of Example 1 is used.

Preparation of the A)/B)/C) Laminate

The single layers A), B) and C), previously obtained, have been overlapped and kept under pressure (about 2–3 bar), at a temperature of 200° C. for 10 minutes.

The A)/B)/C) laminate does not show any adhesion among the layers.

Example 4

Layer A)
  The same polymer of Example 1 is used.

Layer B)

Polyamide PA 12 with —$NH_2$ End Groups Equal to 13 μeq/g Blended with 1% by Weight of Diamine One kilogram of PA 12 in granules, having —$NH_2$ end groups equal to 13 μeq/g, has been blended with 1% by weight of hexamethylendiamine monocarbamate. Then it has been pelletized in a single screw Brabender extruder in Hastelloy C-276 having a diameter of 18 mm and a length equivalent to 25 times the diameter with a melt temperature of 225° C. Two films having a thickness of 0.3 mm have been obtained from the granules by compression moulding.

Layer C)
  The same polymer of Example 1 is used.

Preparation of the A)/B)/C)/B)/A) Laminate

The single layers A), B) and C), previously obtained, have been overlapped according to the sequence A)/B)/C)/B)/A) and kept under pressure (about 2–3 bar) at a temperature of 200° C. for 10 minutes.

By applying a mechanical force one tries to separate the layers.

One cannot measure the adhesion force among the layers. By increasing the force to separate the layers, one breaks the manufactured article without obtaining the delamination. This shows that the laminate according to the invention shows a high adhesion.

Example 5

Example 4 is repeated wherein layer B) is a polyamide PA 12 having —$NH_2$ end groups equal to 45 μeq/g obtained by mechanically mixing 330 g of PA 12 of Example 1 (—$NH_2$=110 μeq/g) with 670 g of PA 12 of Example 2 (—$NH_2$=13 μeq/g). Then the blend has been pelletized in a single screw Brabender extruder in Hastelloy C-276 having a diameter of 18 mm and a length equivalent to 25 times the diameter, with a melt temperature of 225° C. Two films having a thickness of 0.3 mm have been prepared from the granules by compression moulding.

Preparation of the A)/B)/C)/B)/A) Laminate

The single layers A), B) and C), previously obtained, have been overlapped according to the sequence A)/B)/C)/B)/A) and kept under pressure (about 2–3 bar) at a temperature of 200° C. for 10 minutes.

By applying a mechanical force one tries to separate the layers.

One cannot measure the adhesion force among the layers. By increasing the force to separate the layers, one breaks the manufactured article without obtaining the delamination. This shows that the laminate according to the invention shows a high adhesion.

Example 6

Layer A)

The polymer of Example 1 is used.

Layer B)

A film having a thickness of 0.3 mm has been obtained from a polymethylmethacrylate by compression moulding.

Layer C)

The polymer of Example 1 is used.

Preparation of the A)/B)/C) Laminate

The single layers A), B) and C), previously obtained, have been overlapped and kept under pressure (about 2–3 bar) at a temperature of 200° C. for 10 minutes.

By applying a mechanical force one tries to separate layer A) from layer C).

One cannot measure the adhesion force between layer A) and layer C). By increasing the force to separate the layers, one breaks the manufactured article without obtaining the delamination. This shows that the laminate according to the invention shows a high adhesion.

Example 7

Layer A)

The same polymer of Example 1 is used.

Layer B)

The polymer of Example 6 is used.

Layer C)

The same polymer of Example 1 is used.

Preparation of the A)/B)/C)/B)/A) Laminate

The single layers A), B) and C), previously obtained, have been overlapped according to the sequence A)/B)/C)/B)/A) and kept under pressure (about 2–3 bar) at a temperature of 200° C. for 10 minutes.

By applying a mechanical force one tries to separate the layers.

One cannot measure the adhesion force among the layers. By increasing the force to separate the layers, one breaks the manufactured article without obtaining the delamination. This shows that the laminate according to the invention shows a high adhesion.

Example 8

Layer A)

Plaques having a thickness of 1.5 mm have been obtained by compression moulding from a polymer formed by units of vinylidenfluroride (VDF), tetrafluororethylene (TFE) and hexafluoropropene (HFP) in a molar ratio 37/48/15, having $T_{mII}$ equal to 161.8° C.

Layer B)

Polyamide PA 12 Having —$NH_2$ End Groups Equal to 32 μeq/g

The polyamide has been obtained by mechanically mixing 200 g of PA 12 of Example 1 (—$NH_2$=110 μeq/g) with 800 g of PA 12 of Example 2 (—$NH_2$=13 μeq/g). Then the blend has been pelletized in a single screw Brabender extruder in Hastelloy C-276 having a diameter of 18 mm and a length equivalent to 25 times the diameter, with a melt temperature of 225° C. Films having a thickness of 0.3 mm have been prepared from the granules by compression moulding.

Layer C)

The same polymer of Example 1 is used.

Preparation of the A)/B)/C) Laminate

The single layers A), B) and C), previously obtained, have been overlapped and kept under pressure (about 2–3 bar) at a temperature of 200° C. for 10 minutes.

By applying a mechanical force one tries to separate layer A) from layer C).

One cannot measure the adhesion force between layer A) and layer C). By increasing the force to separate the layers, one breaks the manufactured article without obtaining the delamination. This shows that the laminate according to the invention shows a high adhesion.

Example 9

Layer A)

The same polymer of Example 1 is used.

Layer B)

Blend of polymers formed by 77% by weight of HNBR (hydrogenated nitrile butadiene rubber) and by 23% by weight of a VDF/HFP copolymer in a molar ratio 95.3:4.7

Films having a thickness of 0.3 mm have been prepared from the granules by compression moulding.

Layer C)

The same polymer of Example 1 is used.

Preparation of the A)/B)/C) Laminate

The single layers A), B) and C), previously obtained, have been overlapped and kept under pressure (about 2–3 bar) at a temperature of 200° C. for 10 minutes.

By applying a mechanical force one tries to separate layer A) from layer C).

One cannot measure the adhesion force between layer A) and layer C). By increasing the force to separate the layers one breaks the manufactured article without obtaining the delamination. This shows that the laminate according to the invention shows a high adhesion.

The invention claimed is:

1. Multilayers comprising at least one laminate formed in sequence by the following layers:
   A) one thermoprocessable fluoropolymer layer comprising units deriving from vinylidenfluoride (VDF);
   B) one polyamide layer having at least 20 μeq/g of —$NH_2$ groups; and
   C) one layer based on chlorinated polyvinylchloride (CPVC) that contains from 58% to 75% by weight of chlorine.

2. Multilayers according to claim 1, wherein layer B) is formed by a blend of a polymer of layer A) or of layer C), optionally in admixture among each other, with at least 10% by weight of layer B) polymer.

3. Multilayers according to claim 2, wherein layer B) is formed by a blend of the polymer of layer A) or of layer C), optionally in admixture among each other, with at least 50% by weight of layer B) polymer.

4. Multilayers according to claim 1, formed in sequence by five layers A)/B)/C)/B)/A).

5. Multilayers according to claim 1, wherein layer A) fluoropolymers contain at least 10% by moles of units derived from VDF.

6. Multilayers according to claim 1, wherein layer A) fluoropolymers are VDF homopolymers or VDF copolymers with monomers selected from the group consisting of hexafluoropropene (HFP), chlorotrifluoroethylene (CTFE), tetrafluoroethylene (TFE), perfluoroalkylvinylethers, trifluoroethylene, fluorodioxoles, ethylene, and propylene.

7. Multilayers according to claim 1, wherein layer A) fluoropolymer is polyvinylidenfluoride (PVDF).

8. Multilayers according to claim 1, wherein layer B) is a (co)polyamide and is selected from the group consisting of polyamide 6 (PA 6), polyamide 66 (PA 66), polyamide 11 (PA 11), and polyamide 12 (PA 12).

9. Multilayers according to claim 1, wherein the chlorinated polyvinylchloride contains from 60% to 70% by weight of chlorine.

10. Molded articles obtained from multilayers comprising at least one laminate formed in sequence by the following layers:
   A) one thermoprocessable fluoropolymer layer comprising units deriving from vinylidenfluoride (VDF);
   B) one polyamide layer having at least 20 µeq/g of —NH$_2$ groups; and
   C) one layer based on chlorinated polyvinylchloride (CPVC) containing from 58% to 75% by weight of chlorine.

11. Molded articles according to claim 10, wherein layer B) is formed by a blend of a polymer of layer A) or of layer C), optionally in admixture among each other, with at least 10% by weight of layer B) polymer.

12. Molded articles according to claim 11, wherein layer B) is formed by a blend of the polymer of layer A) or of layer C), optionally in admixture among each other, with at least 50% by weight of layer B) polymer.

13. Molded articles according to claim 10, wherein the multilayer is formed in sequence by five layers A)/B)/C)/B)/A).

14. Molded articles according to claim 10, wherein layer A) fluoropolymers contain at least 10% by moles of units derived from VDF.

15. Molded articles according to claim 10, wherein layer A) fluoropolymers are VDF homopolymers or VDF copolymers with monomers selected from the group consisting of hexafluoropropene (HFP), chlorotrifluoroethylene (CTFE), tetrafluoroethylene (TFE), perfluoroalkylvinylethers, trifluoroethylene, fluorodioxoles, ethylene, and propylene.

16. Molded articles according to claim 10, wherein layer A) fluoropolymer is polyvinylidenfluoride (PVDF).

17. Molded articles according to claim 10, wherein layer B) is a (co)polyamide and is selected from the group consisting of polyamide 6 (PA 6), polyamide 66 (PA 66), polyamide 11 (PA 11), and polyamide 12 (PA 12).

18. Wet-benches obtained from the multilayers according to claim 10.

19. Molded articles according to claim 10, wherein the chlorinated polyvinylchloride contains from 60% to 70% by weight of chlorine.

* * * * *